United States Patent
Wang et al.

(10) Patent No.: US 12,380,302 B2
(45) Date of Patent: *Aug. 5, 2025

(54) METHOD, DEVICE, AND SYSTEM FOR GENERATING, REPAIRING, AND IDENTIFYING AN INCOMPLETE QR CODE

(71) Applicant: Alibaba Group Holding Limited, Grand Cayman (KY)

(72) Inventors: Jiaheng Wang, Hangzhou (CN); Jun Xie, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 332 days.

This patent is subject to a terminal disclaimer.

(21) Appl. No.: 17/589,659

(22) Filed: Jan. 31, 2022

(65) Prior Publication Data

US 2022/0156476 A1 May 19, 2022

Related U.S. Application Data

(63) Continuation of application No. 16/228,083, filed on Dec. 20, 2018, now Pat. No. 11,238,255.

(30) Foreign Application Priority Data

Dec. 26, 2017 (CN) .......................... 201711431170.5

(51) Int. Cl.
*G06K 7/14* (2006.01)
*G06K 19/06* (2006.01)

(52) U.S. Cl.
CPC ......... *G06K 7/1491* (2013.01); *G06K 7/1417* (2013.01); *G06K 19/06037* (2013.01)

(58) Field of Classification Search
CPC ............... G06K 7/1491; G06K 7/1417; G06K 19/06037; G06K 7/1473
USPC ....................................................... 235/494
See application file for complete search history.

(56) References Cited

U.S. PATENT DOCUMENTS

| | | | |
|---|---|---|---|
| 8,705,736 | B2 | 4/2014 | Haas et al. |
| 11,238,255 | B2 | 2/2022 | Wang et al. |
| 2005/0286805 | A1 | 12/2005 | Yoshida |
| 2008/0298688 | A1 | 12/2008 | Cheong et al. |
| 2009/0284780 | A1 | 11/2009 | Kitora et al. |
| 2009/0284802 | A1 | 11/2009 | Yeap et al. |

(Continued)

FOREIGN PATENT DOCUMENTS

CN 104463059 3/2015

OTHER PUBLICATIONS

Qianyu, Ji, "Exploring the Concepts of QR Code and the Benefits of using QR Code for Companies", Lapin Amk, School of Business and Culture Degree Programme in Business Information, 2014.

*Primary Examiner* — Steven S Paik
*Assistant Examiner* — Tae W Kim

(57) ABSTRACT

A method of reading a QR code is described. The method includes capturing an image of an incomplete QR code. The incomplete QR code has a missing region with a missing functional pattern. Further, the functional pattern is added to the missing region in the incomplete QR code to form a recovered QR code. Subsequently, pixels are added randomly to the missing region surrounding the functional pattern to add to the recovered QR code. The recovered QR code has a number of functional patterns and a number of modules. Further, data is read from the recovered QR code.

20 Claims, 14 Drawing Sheets

(56) References Cited

U.S. PATENT DOCUMENTS

| | | |
|---|---|---|
| 2010/0031014 A1 | 2/2010 | Senda |
| 2010/0155464 A1 | 6/2010 | Swayn et al. |
| 2010/0164219 A1 | 7/2010 | Jeacock et al. |
| 2012/0232995 A1 | 9/2012 | Castro et al. |
| 2013/0015236 A1 | 1/2013 | Porter et al. |
| 2014/0061316 A1* | 3/2014 | Narayanaswami ............ G06K 19/06037 235/487 |
| 2014/0104449 A1 | 4/2014 | Masarik et al. |
| 2014/0203085 A1 | 7/2014 | Park |
| 2015/0090794 A1 | 4/2015 | Zhang et al. |
| 2015/0090795 A1 | 4/2015 | Zhang et al. |
| 2015/0269331 A1 | 9/2015 | Bolanos et al. |
| 2015/0347889 A1 | 12/2015 | Nosaka et al. |
| 2016/0210545 A1 | 7/2016 | Anderton et al. |
| 2016/0342875 A1 | 11/2016 | Annamalai et al. |
| 2016/0350626 A1 | 12/2016 | Liguori et al. |
| 2016/0358174 A1 | 12/2016 | Kassemi et al. |
| 2016/0364825 A1 | 12/2016 | Pan |
| 2017/0111565 A1 | 4/2017 | Shibahara et al. |
| 2017/0209068 A1 | 7/2017 | Dyer et al. |
| 2017/0337458 A1 | 11/2017 | Ophardt et al. |
| 2017/0351917 A1 | 12/2017 | Son et al. |
| 2018/0012255 A1 | 1/2018 | Tulk |
| 2018/0091304 A1 | 3/2018 | Brook et al. |

* cited by examiner

METHOD, DEVICE, AND SYSTEM FOR GENERATING, REPAIRING, AND IDENTIFYING AN INCOMPLETE QR CODE

CROSS-REFERENCE TO RELATED APPLICATIONS

This application is a continuation of U.S. patent application Ser. No. 16/228,083, filed on Dec. 20, 2018, which claims priority to Chinese Patent Application No. 201711431170.5, filed on Dec. 26, 2017, the disclosure and content of each of which are incorporated herein by reference in their entireties.

BACKGROUND OF THE INVENTION

1. Field of the Invention

The present application relates to the field of communication technologies and, in particular, to a method, device, and system for generating, repairing, and identifying an incomplete QR code.

2. Description of the Related Art

Currently, QR codes can be used to transfer data in many application scenarios. For example, payment can be made by QR code, connection to a wireless network can be established through a QR code, and a business card can be delivered by a QR code. Generally, the process of using a QR code is to display a QR code by a first terminal, scan the QR code on the first terminal by a second terminal, or identify the displayed QR code by the first terminal, thereby acquiring the data contained in the QR code.

There are currently 40 versions of the QR code, and the symbol structures of the different versions of the QR code are slightly different. FIGS. 1A-1E show diagrams that illustrate a series of conventional QR codes. FIG. 1A shows a version 1 QR code 110. FIG. 1B shows a version 2 QR code 120. FIG. 1C shows a version 6 QR code 130. FIG. 1D shows a version 7 QR code 140. FIG. 1E shows a version 14 QR code 150.

FIG. 2 shows a diagram that illustrates a detailed view of a conventional version 7 QR code 200. As shown in FIG. 2, the symbol structure of QR code 200 includes a function pattern 210, an encoding region 220, and a blank region 230. Among them, function pattern 210 is a pattern specifically for positioning and feature identification. Function pattern 210 includes a number of position detection patterns 212 (there are three such patterns, which are located in the upper left corner, lower left corner, and upper right corner), and a number of alignment patterns 214 (there are six alignment patterns in version 7).

Function pattern 210 also includes a number of position detection pattern separatoxs 216 that adjoin the position detection patterns 212, and a timing pattern 218. The area of QR code 200 that is not occupied by the function patterns are encoding region 220. The format of encoding region 220 includes format information 222, version information 224, and a data and an error correction codeword 226.

One of the drawbacks with QR codes is that the shape of the QR code in the QR code image obtained by an image capture device can be distorted by the angle of the lens of the image capture device, such as a terminal or an imaging device, with respect to the plane of the QR code.

FIGS. 3A-3B show diagrams that illustrate a first angular relationship between a conventional QR code and a conventional image capture device. FIG. 3A shows an on-angle position between the QR code and the image capture device. FIG. 3B shows an example of an image of the QR code taken from the on-angle position.

As shown in FIG. 3A, in the on-angle position, a plane 310 of the QR code on a first terminal 312 is parallel to a plane 314 of the lens of a second terminal 316. As shown in FIG. 3B, a QR image 320 of the QR code obtained by second terminal 316 is a normal QR code. In these cases, the normal QR code image does not have a deformation.

FIGS. 4A-4B show diagrams that illustrate a second angular relationship between a conventional QR code and a conventional image capture device. FIG. 4A shows an off-angle position between the QR code and the image capture device. FIG. 4B shows an example of an image of the QR code taken from the off-angle position.

As shown in FIG. 4A, in the off-angle position, a plane 410 of the QR code on a first terminal 412 is non-parallel by an angle with respect to an image capture plane 414 of a second terminal 416. As shown in FIG. 4B, a QR image 420 of the QR code obtained by second terminal 416 is an abnormal QR code. In these cases, the abnormal QR code has a trapezoidal deformation.

One of the limitations of QR codes is that, in the process of identifying a QR code, the QR code may be exposed to the public environment, in which case the QR code may be acquired by a third terminal. That is, a user with malicious intention may use a camera of the third terminal to take a photo of the QR code displayed on the first terminal. In most cases, a malicious third terminal would capture an abnormal QR code. That is, the plane of the lens of the third terminal would likely not be parallel to the plane of the QR code, and would likely have a significant deviation.

The existing technology in the prior art can identify a QR code with a certain degree of deviation. The existing technology in the prior art can also identify a QR code with a certain degree of damage, but such identification requires that the alignment pattern or the position detection pattern be visible. Thus, a malicious third terminal can use the alignment pattern in the process of identifying the QR code having the deformation such that the QR code having the deformation can be corrected using the alignment pattern to obtain a normal QR code.

As a result, the malicious third terminal may be able to identify the QR code and thus obtain the data contained therein. This leads to the risk of leakage of data contained in the QR code, which results in the QR code having a low security level.

SUMMARY OF THE INVENTION

The present invention provides an incomplete QR code that substantially increases the security of QR codes. A method of reading a QR code includes capturing an image of an incomplete QR code, where the incomplete QR code has a missing region with a functional pattern that is missing. The method also includes determining a version of a complete QR code that corresponds with the incomplete QR code, and identifying the functional pattern in the complete QR code that is missing in the incomplete QR code. In addition, the method includes adding the functional pattern to the missing region in the incomplete QR code to form a recovered QR code, and reading data from the recovered QR code.

The present invention further includes a non-transitory computer-readable storage medium having embedded therein program instructions, which when executed by a processor causes the processor to execute a method of reading a QR code. The method includes capturing an image of an incomplete QR code, where the incomplete QR code has a missing region with a functional pattern that is missing. The method also includes determining a version of a complete QR code that corresponds with the incomplete QR code, and identifying the functional pattern in the complete QR code that is missing in the incomplete QR code. Further, the method includes adding the functional pattern to the missing region in the incomplete QR code to form a recovered QR code, and reading data from the recovered QR code.

The present invention also provides a QR code device that includes a memory, an image capture device, and a processor coupled to the memory and the image capture device. The processor to obtain data from the memory and a captured image of an incomplete QR code from the image capture device, where the incomplete QR code has a missing region with a functional pattern that is missing. The processor to further determine a version of a complete QR code that corresponds with the incomplete QR code, and identify the functional pattern in the complete QR code that is missing in the incomplete QR code. In addition, the processor to add the functional pattern to the missing region in the incomplete QR code to form a recovered QR code, and read data from the recovered QR code.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

The drawings described herein are provided for further understanding of the present application, and form a part of the present application. The exemplary embodiments of the present application and the description thereof are for explaining the present invention and do not constitute an undue limitation to the scope of the present invention.

FIG. 1A illustrates a version 1 QR code 110. FIG. 1B illustrates a version 2 QR code 120. FIG. 1C illustrates a version 6 QR code 130. FIG. 1D illustrates a version 7 QR code 140. FIG. 1E illustrates a version 14 QR code 150.

FIG. 3A illustrates an on-angle position between the QR code and the image capture device. FIG. 3B illustrates an example of an image of the QR code taken from the on-angle position.

FIG. 4A illustrates an off-angle position between the QR code and the image capture device. FIG. 4B illustrates an example of an image of the QR code taken from the off-angle position.

FIG. 5A illustrates a first example of QR code 500. FIG. 5B illustrates a second example of QR code 500.

FIG. 6A illustrates a first example of QR code 600. FIG. 6B illustrates a second example of QR code 600. FIG. 6C illustrates a third example of QR code 600.

FIG. 7A illustrates a modified version 6 QR code 700, while FIG. 7B illustrates a modified version 7 QR code 705.

FIG. 11A illustrates an example of an incomplete QR code 1100. FIG. 11B illustrates an example of a partially restored QR code 1110. FIG. 11C illustrates an example of the restored QR code 1120.

DETAILED DESCRIPTION OF THE INVENTION

Figure 1A:
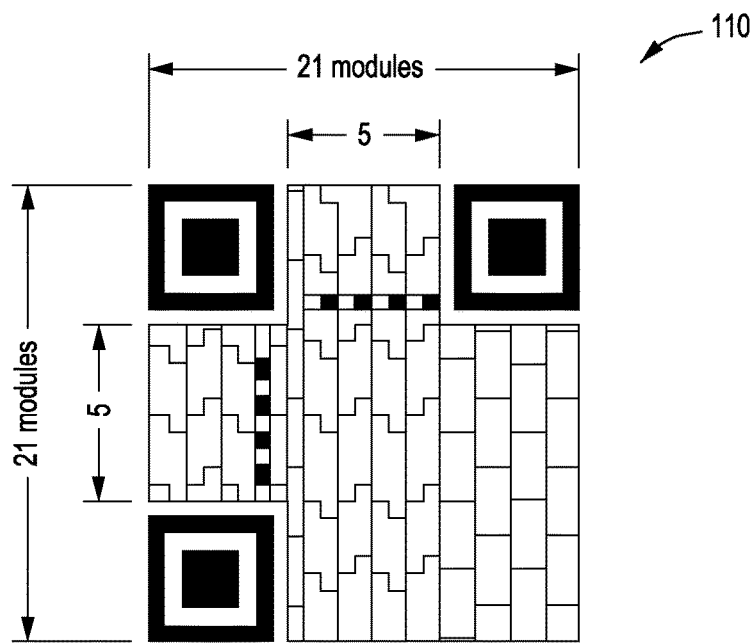
FIGS. 1A-1E are diagrams illustrating a series of conventional QR codes.
Figure 1B:
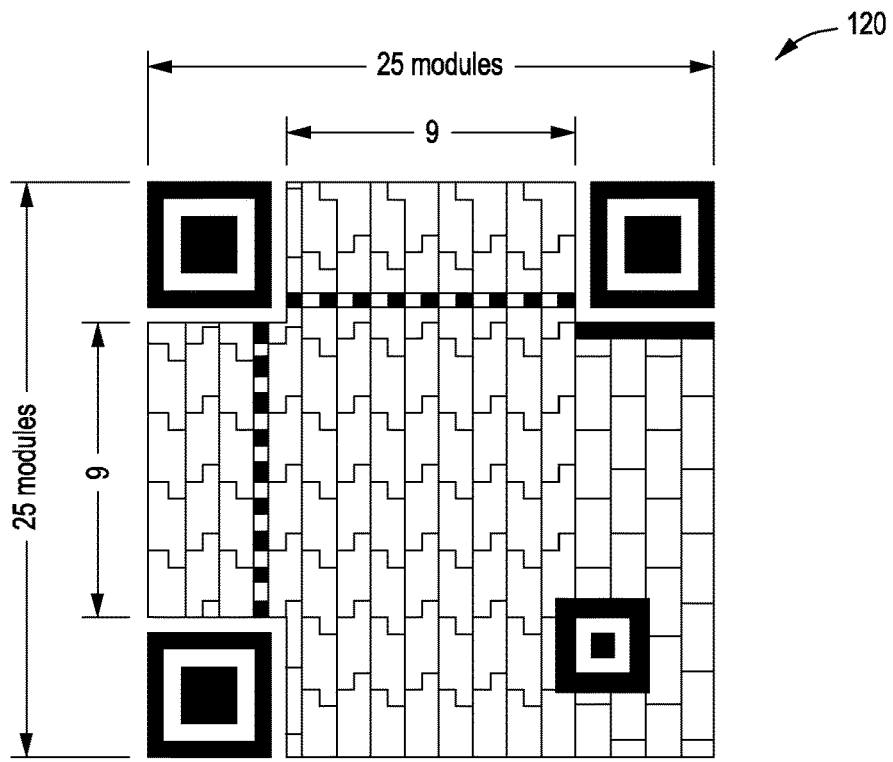

The technical solutions in the embodiments of the present application will be clearly and completely described in the following sections with reference to the drawings of the embodiments of the present application. It is obvious that the described embodiments are only a part of the embodiments, rather than all of the embodiments of the present application. All other embodiments obtained by a person of ordinary skill in the art based on the embodiments of the present application without departing from the inventive skills are within the scope of the present application.

It should be noted that the terms "first," "second," and the like in the description and claims of the present invention and in the above drawings are used to distinguish similar objects and are not necessarily used to describe a specific sequence or order. It should be understood that these numbers may be interchanged where appropriate so that the embodiments of the present invention described herein can be implemented in orders other than those illustrated or described herein.

Terminologies

QR code: English term QR Code, also known as QR barcode or quick response matrix code.

Error correction level: In the case that the QR code has a certain degree of damage, the maximum proportion can be missing when the code can still be identified by the decoding software. At present, the QR code has 4 error correction levels, and the recoverable code word ratio is: L level 7%, M level 15%, Q level 25%, and H level 30%.

Version: English term version. It is used to represent the series of QR code symbol specifications. Currently, the QR code has 40 versions. A particular version is determined based on its position in the allowed specification series. The specification series allowed for the QR code is 21 modules× 21 modules (version 1) to 177 modules×177 modules (version 40). From 21×21 modules to 177×177 modules (versions 1 to 40), each version adds 4 modules per side than the previous version. It can also indicate the level of error correction applied by the QR code.

Alignment pattern: English term alignment pattern. It is a fixed reference pattern for determining the position of the QR code. In the case that the QR code has a certain degree of damage, the decoding software can synchronize the coordinates of the modules in QR code through the alignment pattern.

Position detection pattern: a position detection pattern is one of the three identical patterns that make up an image searching pattern.

Timing graphic: English term timing pattern. It is a pattern of interlaced dark and light color modules and used to determine the coordinates of the module in the symbol.

Separatox: The English term separatox, a functional pattern used to separate the position detection pattern from the rest of the symbol. It is composed of light-colored modules, and its width is one module.

Function pattern: a function pattern is a specific pattern used for positioning and feature identifying in a QR code, mainly including a position detection pattern, an alignment pattern, a position detection pattern separatox and a timing pattern.

Format information: English term format information. It includes the error correction level used by the symbol and the function pattern of the mask pattern information and is for decoding the remaining portion of the encoding region.

Version information: English term version information. It includes the information of the version of the QR code and its error correction position.

Encoding region: English term encoding region. It is a region in a QR code that is not occupied by a function pattern, and is the region used to encode the data or error correction codeword.

Data or error correction codeword. It is the data or error correction codeword carried by a QR code.

Encoding region format: a general term for format information, version information, and data and error correction codeword.

Figure 5A:
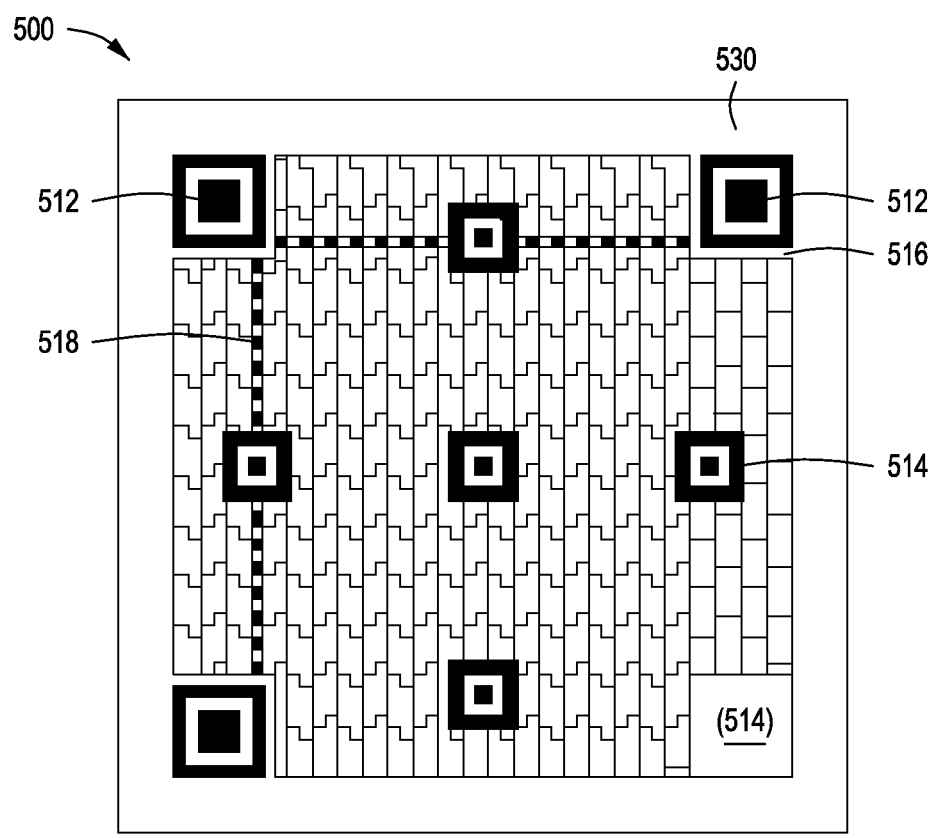
FIGS. 5A-5B are diagrams illustrating examples of a modified version 7 QR code 500 in accordance with the present invention.
Figure 5B:
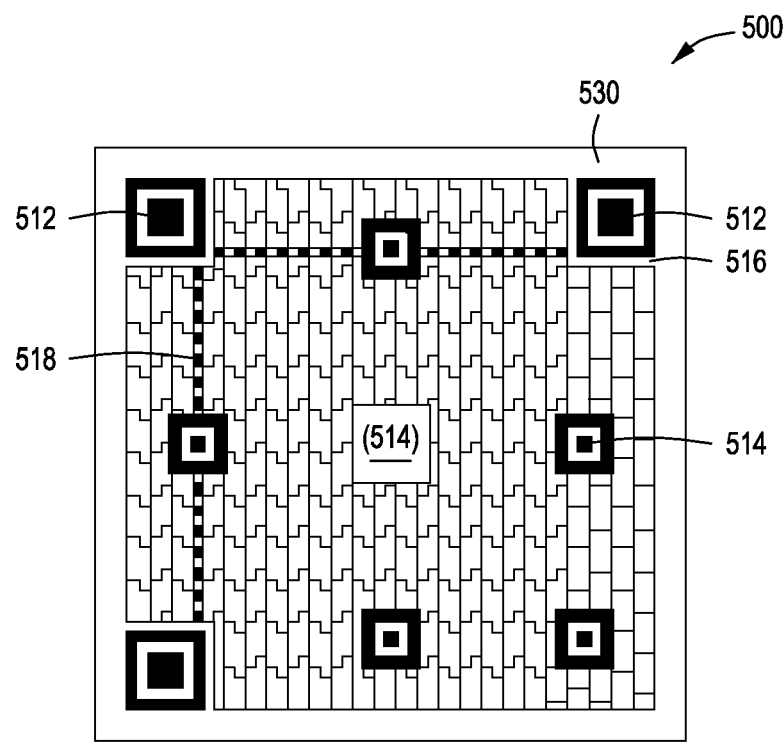

FIGS. 5A-5B show diagrams that illustrate examples of a modified version 7 QR code 500 in accordance with the present invention. FIG. 5A shows a first example of QR code 500, while FIG. 5B shows a second example of QR code 500. As described in greater detail below, the present invention removes portions of the QR code so that the data encoded in the QR code cannot be obtained by a malicious third terminal from an image capture angle likely to be available to the malicious third terminal. The present invention also provide a method for recovering the original QR code by a verified user.

As shown in FIGS. 5A-5B, in both examples, QR code 500 includes a function pattern and an encoding region. The function pattern includes a number of position detection patterns 512, and a number of alignment patterns 514. The function pattern also includes a number of position detection pattern separatoxs 516 that adjoin the position detection patterns 514, and a timing pattern 518. QR code 500 also include a blank region 530. The area of QR code 500 that is not occupied by the function patterns are an encoding region. The format of the encoding region includes format information, version information, and a data and an error correction codeword.

As shown in FIG. 5A, in the first example, the alignment pattern (514) in the lower right corner of QR code 500 has been removed, while in the second example shown in FIG. 5B, the alignment pattern (514) in the center of QR code 500 has been removed. In both cases, the removal of the alignment pattern prevents a malicious third terminal from being able to regenerate the original QR code. (An alignment pattern in the lower right corner is present in version 2 and subsequent versions. An alignment pattern in the center is present in version 7 and subsequent versions.)

In addition, more than one alignment pattern can alternately be removed, and the alignment patterns in the other positions of the QR code can alternately be removed. That is, the position of the removed alignment pattern in the QR code can be controlled according to actual conditions or needs. As a result, this embodiment does not limit the position of the removed alignment pattern.

Figure 6A:
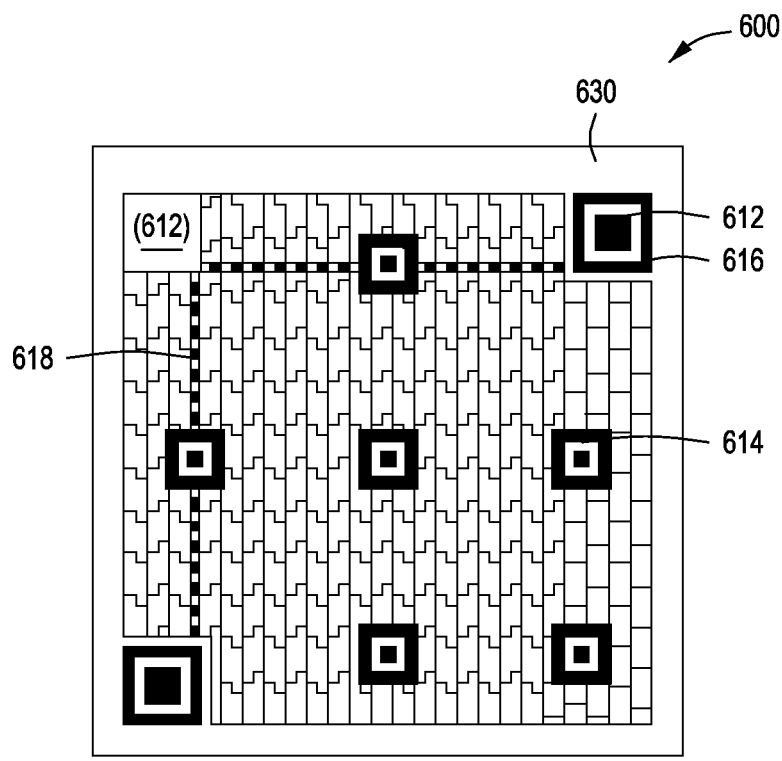
FIGS. 6A-6C are diagrams illustrating examples of a modified version 7 QR code 600 in accordance with the present invention.
Figure 6B:
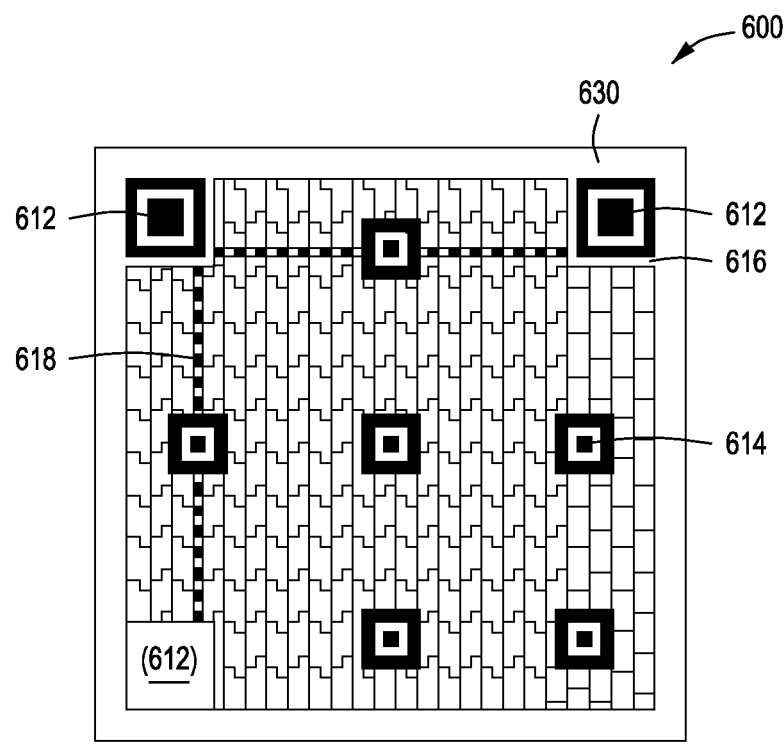
Figure 6C:
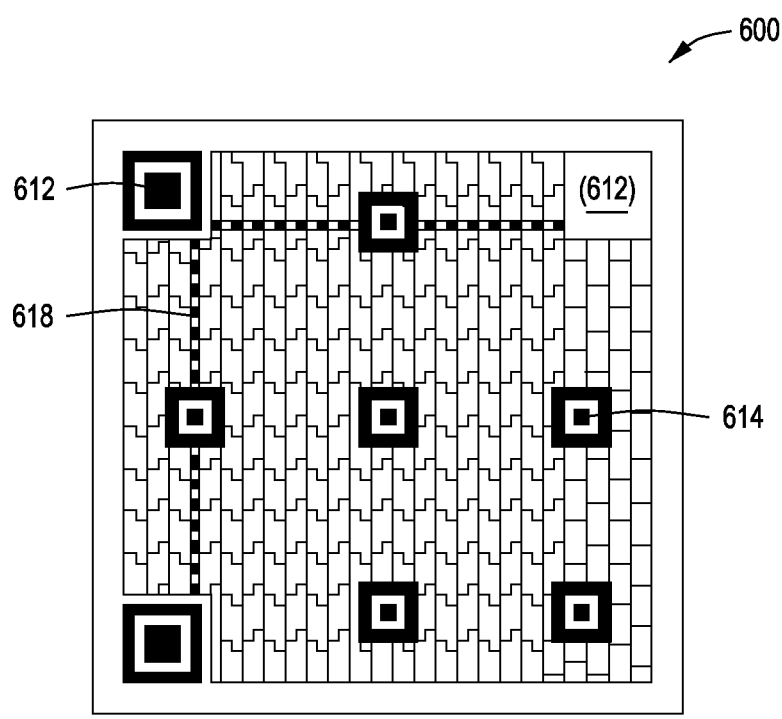

FIGS. 6A-6C show diagrams that illustrate examples of a modified version 7 QR code 600 in accordance with the present invention. FIG. 6A shows a first example of QR code 600, while FIG. 6B shows a second example of QR code 600 and FIG. 6C shows a third example of QR code 600. As shown in FIGS. 6A-6C, in each example, QR code 600 includes a function pattern and an encoding region. The function pattern includes a number of position detection patterns 612, and a number of alignment patterns 614.

The function pattern also includes a number of position detection pattern separatoxs 616 that adjoin the position detection patterns 614, and a timing pattern 618. QR code 600 also include a blank region 630. The area of QR code 600 that is not occupied by the function patterns are an encoding region. The format of the encoding region includes format information, version information, and a data and an error correction codeword.

As shown in FIG. 6A, the position detection pattern (612) in the upper left corner of QR code 600 has been removed, while as shown in FIGS. 6B and 6C, the position detection patterns (612) in the lower left corner and upper right corner, respectively, have been removed. In each case, the removal of the position detection pattern prevents a malicious third terminal from being able to regenerate the original QR code. (Each version of the QR code has three position detection patterns, which are located in the upper left corner, the lower left corner, and the upper right corner respectively.) Only one position detection pattern can be missed in the QR code of version 6 or lower. If two or even three position detection patterns are not visible, the QR code cannot be identified anymore.

Figure 7A:
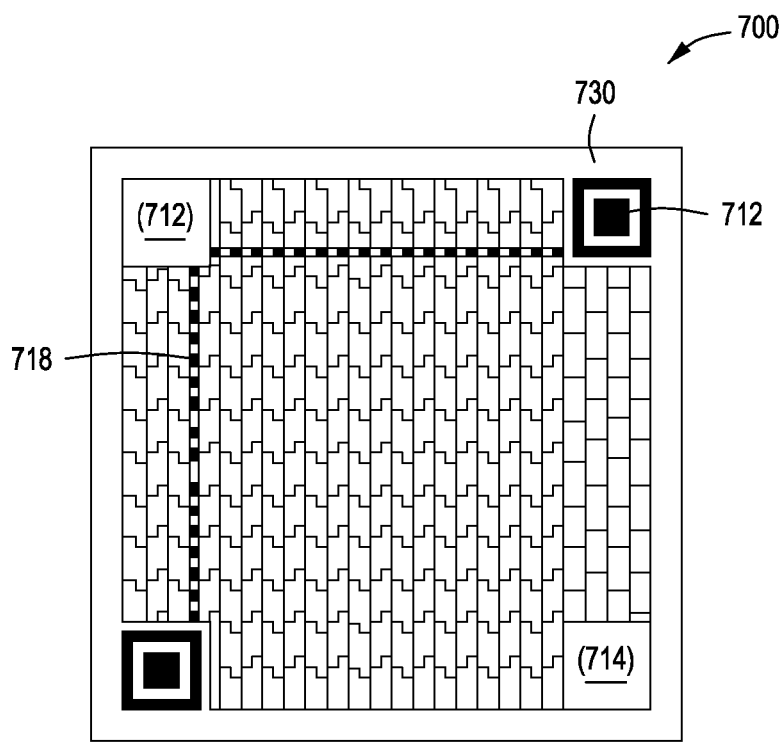
FIGS. 7A-7B are diagrams illustrating examples of modified QR codes in accordance with the present invention.
Figure 7B:
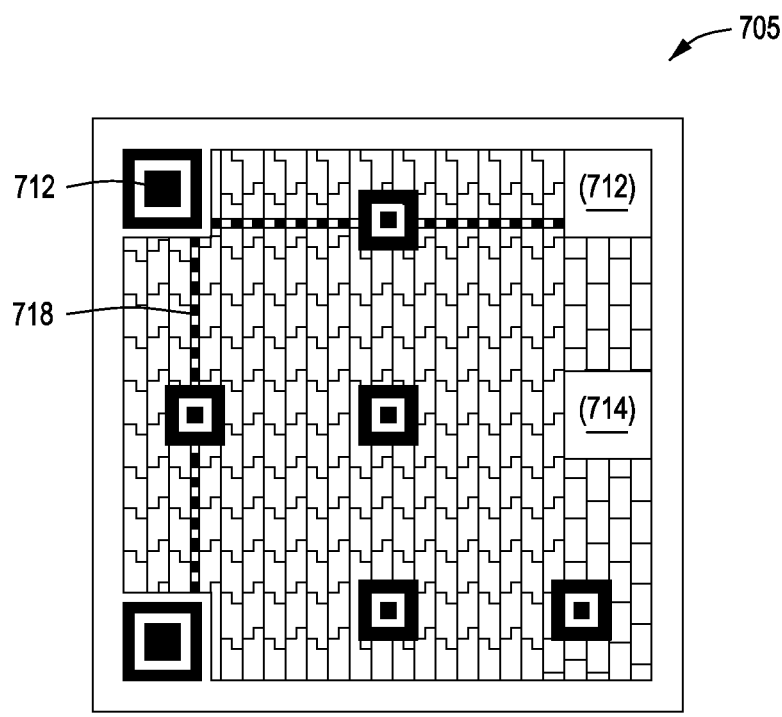

FIGS. 7A-7B show diagrams that illustrate examples of modified QR codes in accordance with the present invention. FIG. 7A shows a modified version 6 QR code 700, while FIG. 7B shows a modified version 7 QR code 705. As shown in FIGS. 7A-7B, in both examples, QR codes 700 and 705 include a function pattern and an encoding region. The function pattern includes a number of position detection patterns 712, and a number of alignment patterns 714.

The function pattern also includes a number of position detection pattern separatoxs 716 that adjoin the position detection patterns 714, and a timing pattern 718. QR codes 700 and 705 also include a blank region 730. The area of the QR codes 700 and 705 that is not occupied by the function patterns are an encoding region. The format of the encoding region includes format information, version information, and a data and an error correction codeword.

As shown in FIG. 7A, the alignment pattern (714) in the lower right corner and the position detection patter (712) in the upper left corner of QR code 700 have been removed, while as shown in FIG. 7B, the alignment pattern (714) in the center right side and the position detection patter (712) the upper right corner of QR code 700 have been removed. In both cases, the removal of both the alignment pattern and the position detection pattern prevent a malicious third terminal from being able to regenerate the original QR code.

Since there is only one alignment pattern in the QR code of version 6 and below, there is only one available alignment pattern in version 6. That is in FIG. 7A, the omitted alignment pattern and the position detection pattern have a diagonal relationship, as shown in FIG. 7A. If the position detection pattern is adjacent to the alignment pattern, and they are not visible, the QR code cannot be identified later on. For the QR codes of version 7 and higher, it can be an incomplete QR code having at least one position detection pattern and at least one alignment pattern invisible, as shown in FIG. 7B.

In the present application, an incomplete QR code is obtained after the alignment pattern or the position detection pattern is made invisible in the QR code. The prior art technology cannot identify the incomplete QR code provided in the present application. Therefore, even if a malicious third terminal steals an incomplete QR code, the data in the QR code cannot be identified by it. As a result, the present application can protect the data security of the QR code.

In order to facilitate the subsequent identification of an incomplete QR code, the size of the incomplete area is limited such that the area removed from the QR code should be smaller than the product of the area of the original QR code and the error correction level. At present, the QR code has four error correction levels, and their respective recoverable code word ratio is as follows: L level 7%, M level 15%, Q level 25%, and H level 30%.

This ratio indicates the proportion of the maximum area that can be deleted from a QR code while the QR code can still be identified by the decoding software in the case where the QR code has a certain degree of damage. For example, if the area of a QR code is 10 cm*10 cm and the level of error correction is 25% of the Q level, the ratio of the maximum area that can be deleted is 25%, and the maximum area that can be deleted is 10 cm*10 cm*0.25.

Figure 8:
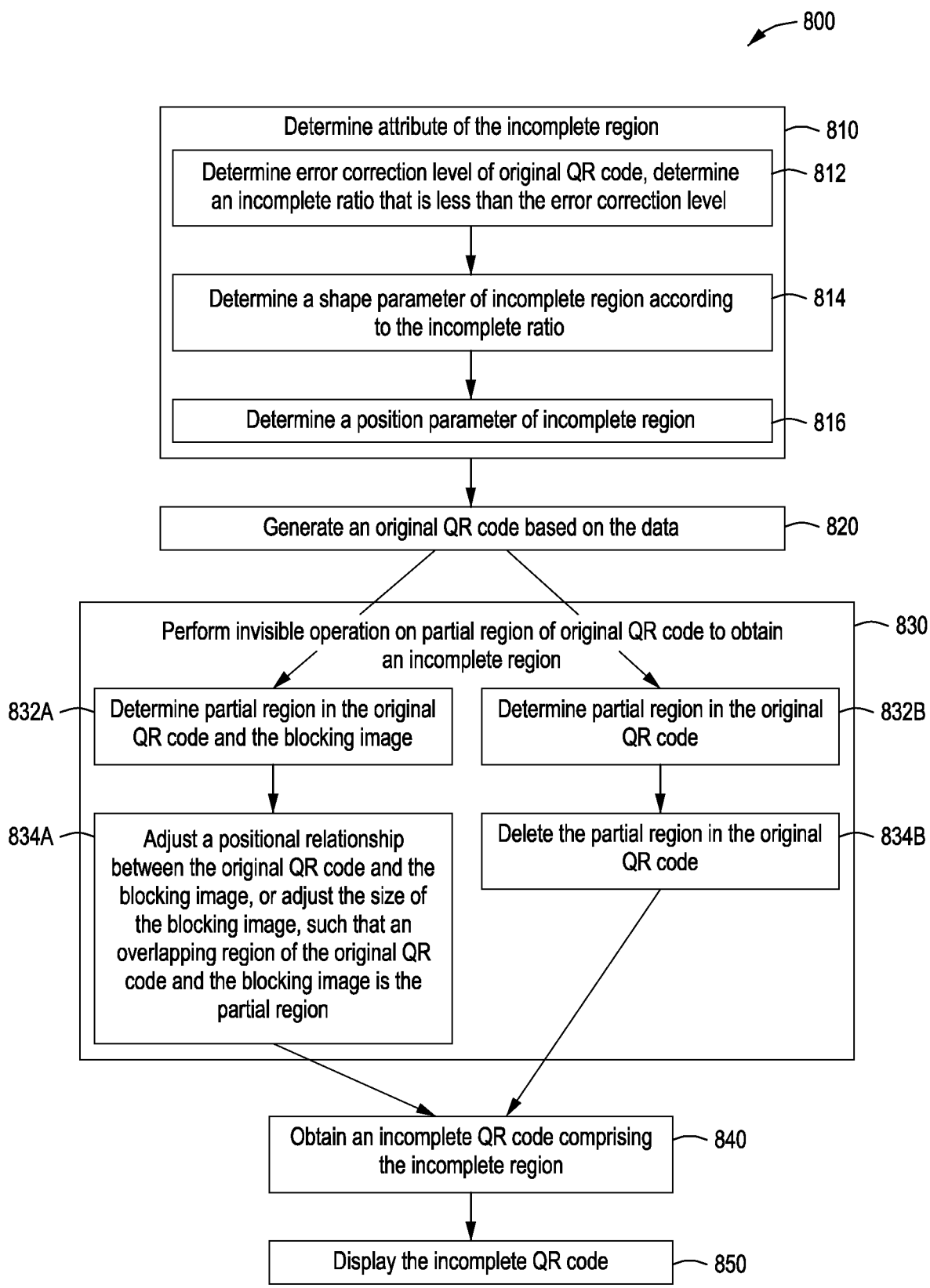
FIG. 8 is a flowchart illustrating an example of a method 800 of generating an incomplete QR code in accordance with the present invention.

FIG. 8 shows a flowchart that illustrates an example of a method 800 of generating an incomplete QR code in accordance with the present invention. As shown in FIG. 8, method 800 begins at step 810 by determining a preset attribute of an incomplete region. The preset attribute includes a shape parameter and a position parameter such that the area of the incomplete region is smaller than a product of the area of the original QR code and an error correction level.

In the present example, step 810 includes step 812 where method 800 determines the error correction level of the original QR code, and determines an incomplete ratio that is smaller than the error correction level. Typically, in order to ensure that the incomplete QR code can be identified, the incomplete ratio should be smaller than the error correction level. For example, in the case where the error correction level is 25%, the deletion ratio can be set to 20%, that is, the maximum missing area is 10 cm*10 cm*0.20.

After the error correction level and the incomplete ratio have been determined in step 812, method 800 moves to step 814 to determine a shape parameter of the incomplete region based on the incomplete ratio. Take the case where the incomplete region is a square and the incomplete ratio is 20%. That is, the area of the incomplete region is 20% of that of the original QR code.

Assuming that the side length of the original QR code is a, and the side length of the missing square is x, then ax*ax=0.2*a*a, and x=0.447 is obtained. The number can be used directly or used as 0.4. The shape parameter of the incomplete region is square and the side length is 0.4* side length. Of course, the incomplete region can also be other shapes, such as a square, a circle, a triangle, a diamond, or the like.

After the shape parameter has been determined in step 814, method 800 moves to step 816 to determine a position parameter of the incomplete region. The position of the module is represented by the row and column coordinates in a QR code, and its format is (Ci, j), where i is the number of rows in which the module is located (calculated from top to bottom), j is the number of columns (calculated from left to right), and the count starts at 0, so the module (C0,0) represents the module in the upper left corner of the QR code. Thus, step 816 determines the location of the incomplete region and the coordinates of the incomplete region. For example, if the position of the incomplete region is that of the position detection pattern in the upper left corner, the position parameter of the incomplete region would be (C0, 0).

Method 800 next moves to step 820 to generate an original QR code based on the data, obtain the data to be transmitted, and then generate an original QR code based on the data to be transmitted. This process is already mature technology in the art and will not be described herein.

Following this, method 800 moves to step 830 to perform an invisible (blanking) operation on a partial region of the original QR code to obtain an incomplete region, wherein the partial region of the original QR code includes at least one alignment pattern and/or at least one position detection pattern. The blanking operation can be implemented as a blocking operation or a deletion operation.

With respect to the blocking operation, step 830 includes a series of image blocking operation steps that begin with step 832A where method 800 determines a partial region of the original QR code and a blocking image. The preset attribute of the incomplete region is acquired in step 810 and stored in the memory. This step can obtain the preset attribute from the memory. That is, the shape parameter and the position parameter of the incomplete region. A module corresponding to the position parameter is determined in the original QR code, and a partial region corresponding to the shape parameter is determined in the module as well.

For example, the original QR code has a side length of 10 cm, the position parameter is (C0, 0), the shape parameter is a square with a side length of 0.4* the original QR code side length. These parameters describe the to-be-blanked area by way of starting from the upper left corner of the original QR code, and then extending 4 cm on both sides to form a square with a side length of 4 cm. The region where the square is located in the original QR code is the partial region that will become the incomplete region. The blocking image can be a blank image, or an image with a pattern, which is not limited in this embodiment.

Next, method 800 moves to 834A to adjust a positional relationship between the original QR code and the blocking image or adjust the size of the blocking image such that an overlapping region of the original QR code and the blocking image is the partial region. Alternatively, the size of the blocking image can be adjusted such that an overlapping region of the original QR code and the blocking image becomes the partial region. Optionally, the blocking region is a blank image so that the incomplete region in the incomplete QR code can be kept free of impurities, and the subsequent repair of the incomplete region can be easier.

With respect to the deletion operation, step 830 includes a series of image blocking operation steps that begin with step 832B where method 800 determines a partial region of the original QR code. The step of determining the partial region of the original QR code is consistent with the foregoing step 832A. Next, method 800 moves from 832B to step 834B to delete a partial region from the original QR code.

After the invisible (blanking) operation has been performed in the partial region, method 800 next moves to 840 to obtain an incomplete QR code including the incomplete region. Following this, method 800 moves to 850 to display the incomplete QR code. A terminal can display the incomplete QR code for being scanned by another terminal.

The present application also provides a data processing method that includes obtaining a first QR code, and blocking at least a partial region of the first QR code so as to obtain a second QR code. The at least partial region includes at least one alignment pattern and/or at least one position detection pattern. The present application additionally includes a data processing method that includes obtaining a first QR code, and detecting at least a partial region of the first QR code so as to obtain a second QR code. The at least partial region includes at least one alignment pattern and/or at least one position detection pattern.

In the above data processing method, the step of obtaining the first QR code includes generating a first QR code based on network information. In addition, after the second QR code is obtained by blocking or deleting at least a partial region of the first QR code, the method further includes scanning the second QR code to obtain an image that includes the second QR code, repairing the second QR code so as to obtain a normal QR code, identifying the normal QR code to obtain network data, and then connecting to the Internet of Things based on the network information.

In the above data processing method, the step of obtaining the first QR code includes generating a first QR code based on payment information. In addition, after the second QR code is obtained by blocking or deleting at least a partial region of the first QR code, the method further includes scanning the second QR code to obtain an image that includes the second QR code, repairing the second QR code so as to obtain a normal QR code, identifying the normal QR code to obtain payment information, and then performing a payment operation based on the payment information. For a specific implementation of the data processing method, reference may be made to the embodiment shown in FIG. 8 (the first QR code is equivalent to the original QR code, and the second QR code is equivalent to the incomplete QR code).

Figure 9:
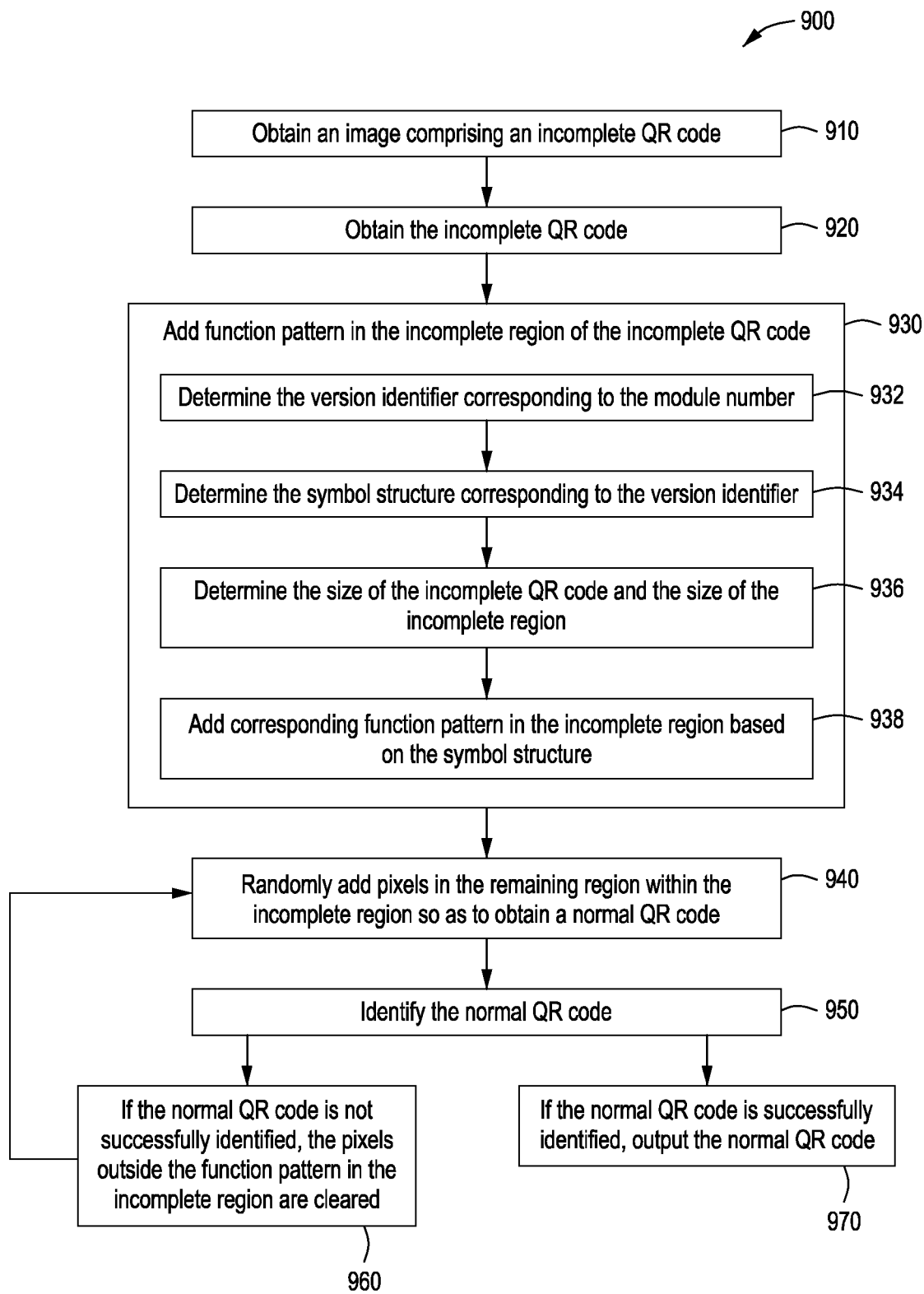
FIG. 9 is a flowchart illustrating an example of a method 900 for identifying an incomplete PQ code in accordance with the present invention.

FIG. 9 shows a flowchart that illustrates an example of a method 900 for identifying an incomplete PQ code in accordance with the present invention. As shown in FIG. 9, method 900 begins at step 910 where method 900 obtains an image comprising an incomplete QR code, wherein at least one alignment pattern of the incomplete QR code is invisible, and/or at least one position detection pattern is invisible. In a case where a first terminal displays the incomplete QR code, the second terminal (the terminal applying the identification method of the QR code) can capture the incomplete QR code displayed by the first terminal, thereby obtaining an image including the incomplete QR code.

Since the alignment pattern or the position detection pattern is missing in the incomplete QR code, the incomplete QR code having a deformation cannot be corrected. To this end, the terminal can display a prompt message, such as "make the lens perpendicular to the QR code," to remind the second terminal user to minimize the deformation of the incomplete QR code. In the best case, the plane of the lens of the second terminal is perpendicular to the plane of the QR code so that the deformation of the incomplete QR code is zero. However, there are certain inevitable errors in an operating process, and it is unlikely that an incomplete QR code with a zero deformation can be obtained.

Since the QR code can have a certain degree of error correction capability, the incomplete QR code with a slight deformation can be corrected by such error correction capability. However, the error correction capability is limited so it is required that the trapezoidal deformation of the incomplete QR code should be smaller than a preset trapezoidal deformation.

For this purpose, the shooting angle is smaller than the preset angle when an image containing an incomplete QR code is taken. That is, the image of the incomplete QR code is obtained when the incomplete QR code is shot under the condition that the shooting angle is smaller than the preset angle so that the trapezoidal deformation of the incomplete QR code is smaller than the preset trapezoidal deformation.

Figure 10:
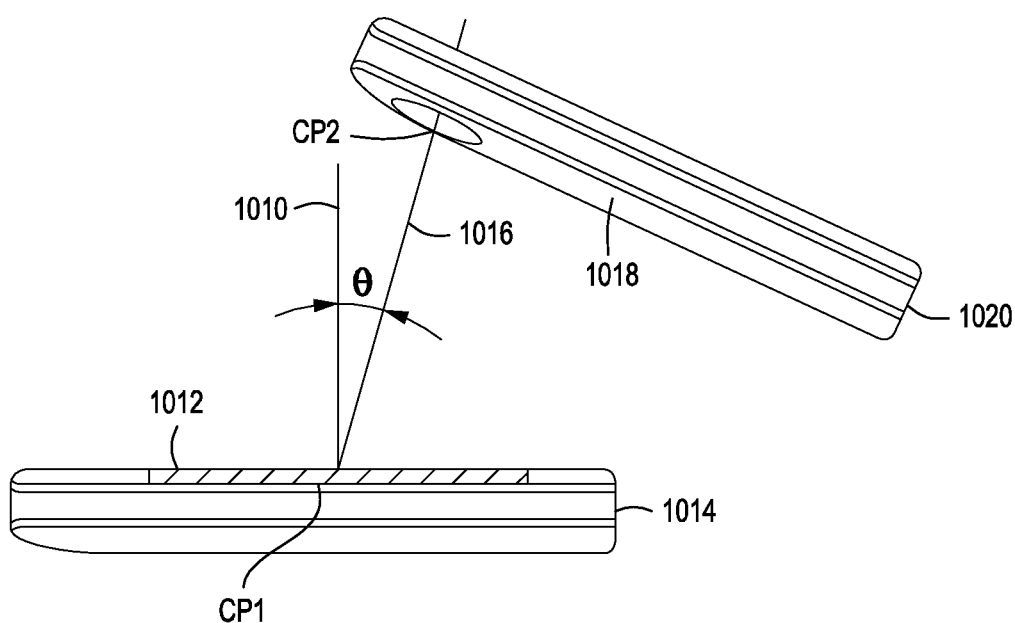
FIG. 10 is a diagram illustrating an example of a shooting angle in accordance with the present invention.

FIG. 10 shows a diagram that illustrates an example of a shooting angle in accordance with the present invention. As shown in FIG. 10, the shooting angle is an angle $\theta$ formed by a line 1010 that is perpendicular to a plane 1012 of an incomplete QR code displayed on a first terminal 1014, and a line 1016 perpendicular to an image capture plane 1018 of a lens on a second terminal 1020. Both lines 1010 and 1016 pass through a center point CP1 of the incomplete QR code, while line 1016 passes through a center point CP2 of the lens.

In the case where the angle $\theta$ is smaller than a preset angle, there is a possibility that the incomplete QR code can be identified. In the case where the angle $\theta$ is larger than the preset angle, it is very unlikely that the incomplete QR code can be identified (it is not excluded that a more advanced technology may be developed in the future to identify the QR code, yet the current identification technology cannot identify the incomplete QR code having such deformation).

Typically, a third terminal (where the third terminal is held by a malicious user) is located not far away from the geographic location of the second terminal. As a result, since the third terminal is not able to shoot the QR code displayed on the first terminal exactly in front of the display of the first terminal, the angle formed by the plane of the lens of the third terminal and the plane of the QR code is much larger than the angle $\theta$. This causes the trapezoidal deformation of the incomplete QR code in the image containing the incomplete QR code to be larger than the preset trapezoidal deformation, and it is thus very likely that the incomplete QR code cannot be identified.

Referring again to FIG. 9, method 900 next moves to step 920 to obtain the incomplete QR code. In the image containing the incomplete QR code, the region where the incomplete QR code is located is determined, and other areas are deleted. Following this, method 900 moves to step 930 to add a function pattern in the incomplete region of the incomplete QR code.

In the present example, step 930 can include step 932 where method 900 determines a version identifier of the QR code corresponding to the number of modules. With reference to FIGS. 1A to 1E, the number of modules on each side of the QR code of different versions can be different, and a terminal can determine the number of modules on a complete edge, thereby determining the version identifier of the QR code corresponding to the number of modules.

Figure 11A:
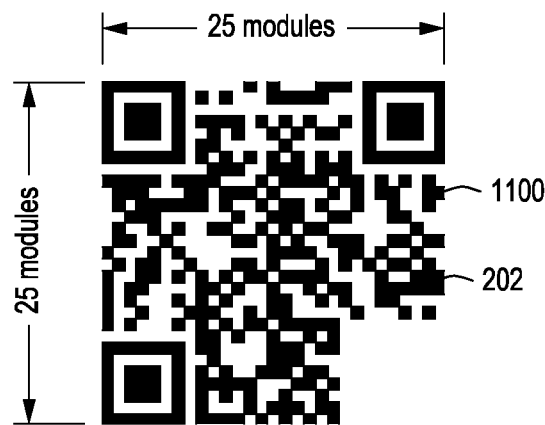
FIGS. 11A-11C are diagrams illustrating an example of the reconstruction of an incomplete QR code in accordance with the present invention.
Figure 11B:
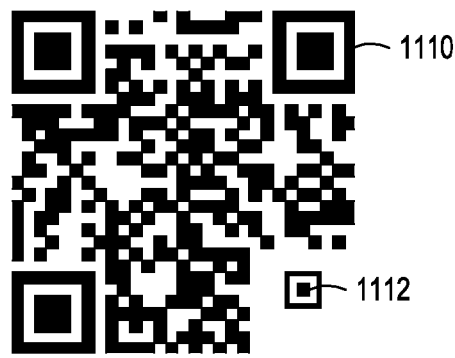
Figure 11C:
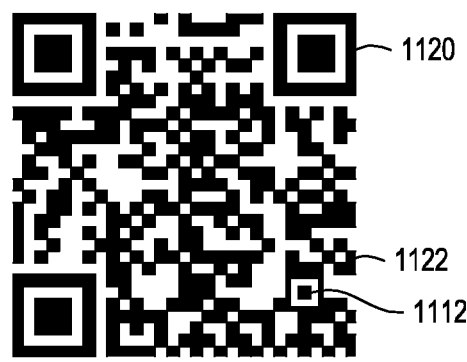

FIGS. 11A-11C show diagrams that illustrate an example of the reconstruction of an incomplete QR code in accordance with the present invention. FIG. 11A shows an example of an incomplete QR code 1100, FIG. 11B shows an example of a partially restored QR code 1110, and FIG. 11C shows an example of the restored QR code 1120. Thus, with respect to step 932, as shown in FIG. 11A, the number of modules on one side of incomplete QR code 1100 is 25, which corresponds to version 6.

Figure 1C:
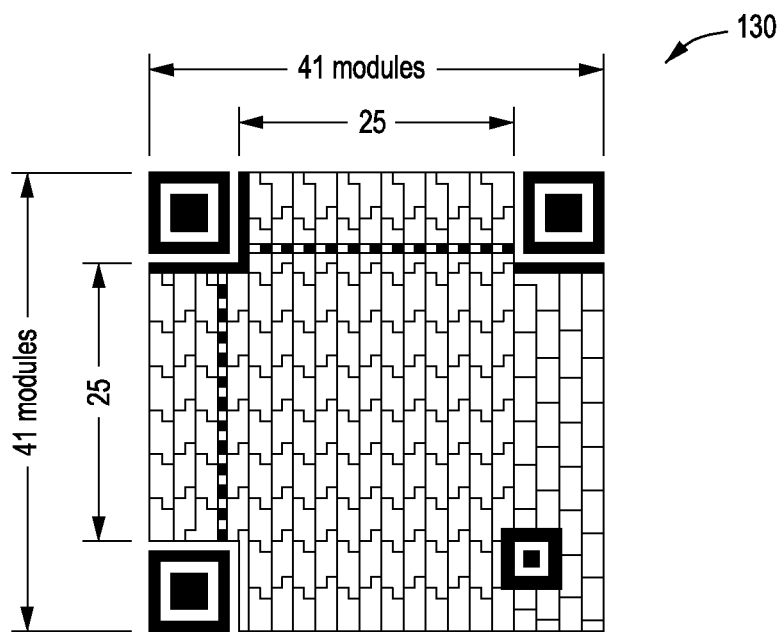
Figure 1D:
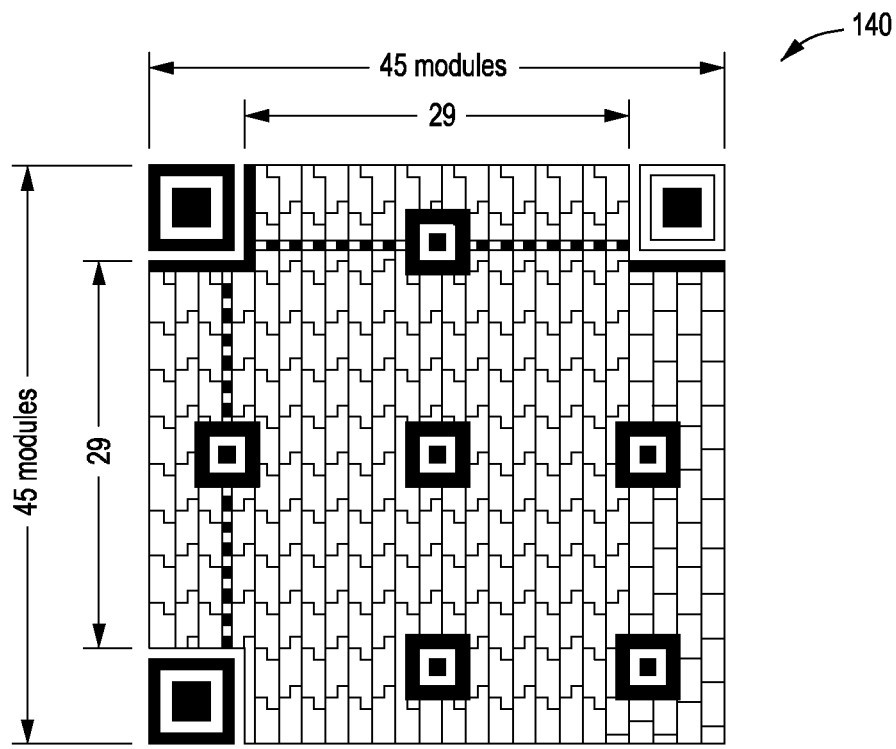
Figure 1E:
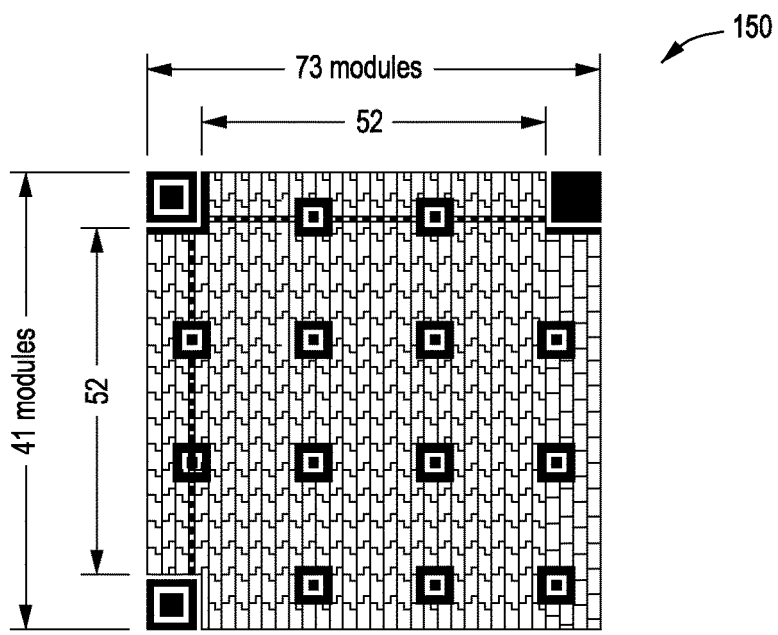
Figure 2:
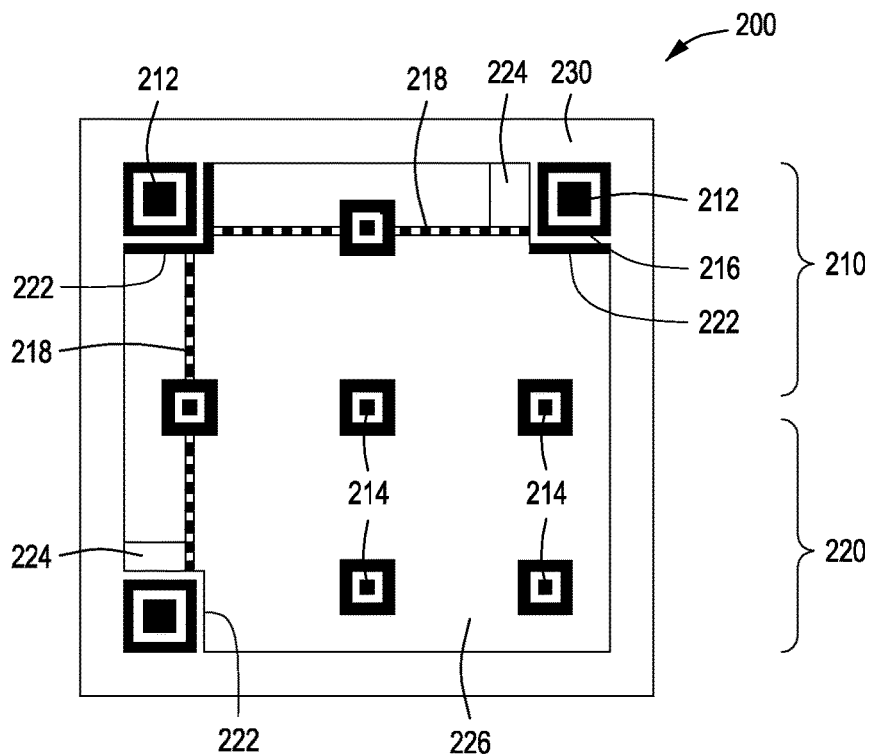
FIG. 2 is a diagram illustrates a detailed view of a conventional version 7 QR code 200.
Figure 3A:
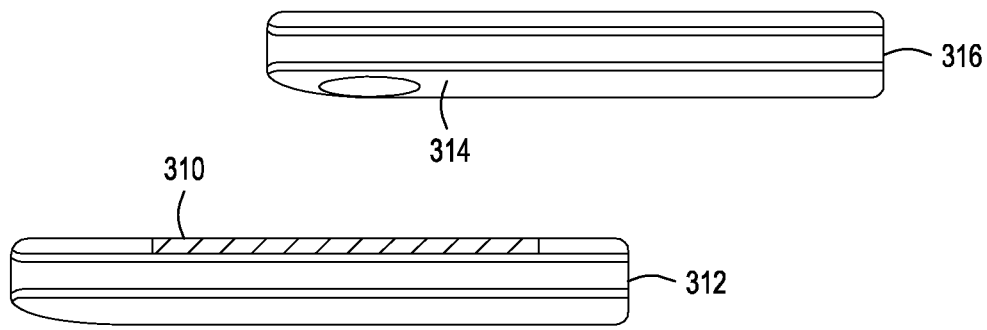
FIGS. 3A-3B are diagrams illustrating a first angular relationship between a conventional QR code and a conventional image capture device.
Figure 3B:
Figure 4A:
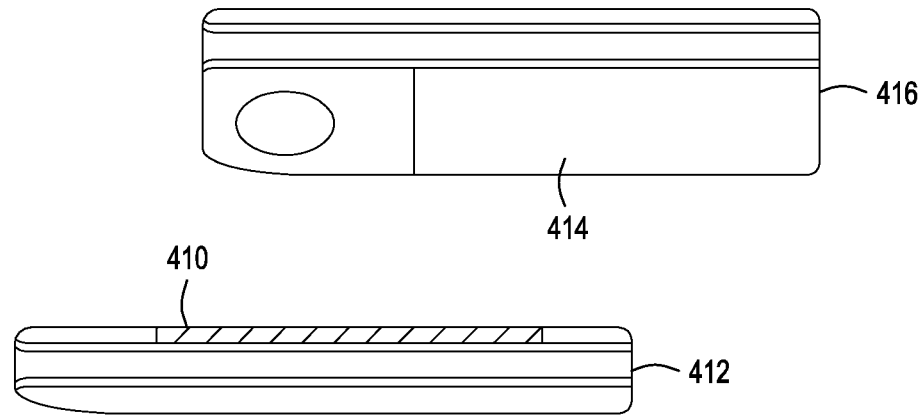
FIGS. 4A-4B are diagrams illustrating a second angular relationship between a conventional QR code and a conventional image capture device.
Figure 4B:
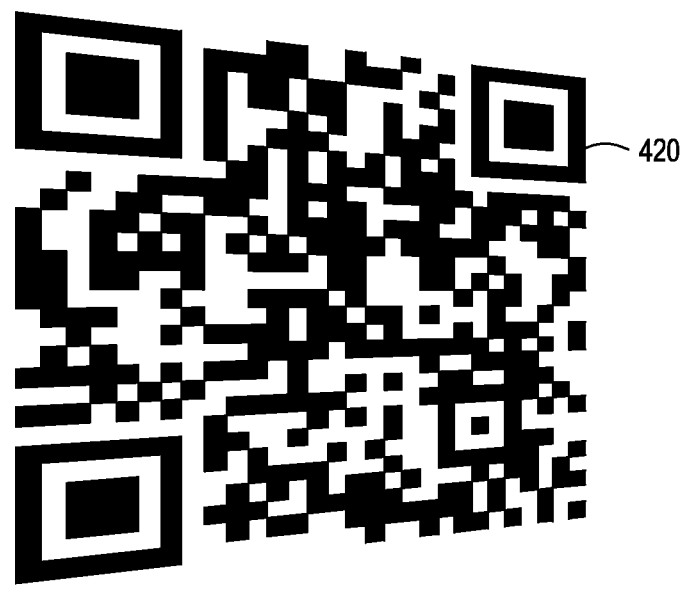

Referring again to FIG. 9, after the version identifier has been determined in step 932, method 900 moves to step 934 to determine a symbol structure corresponding to the version identifier. Each version identifier has a corresponding symbol structure. Hence, after obtaining the version identifier, a symbol structure corresponding thereto can be found. For example, FIG. 1C shows the symbol structure of module 6.

Next, method 900 moves from step 934 to step 936 to determine the size of the incomplete QR code and the size of the incomplete region, and then to step 938 to add a corresponding function pattern into the incomplete region based on the symbol structure. The function structure missing from the incomplete QR code can be known according to the symbol structure.

Therefore, in the incomplete region of the incomplete QR code, the missing function pattern can be added in proportion to the size of the incomplete QR code. Thus, with respect to step 938, as shown in FIG. 11B, an alignment pattern 1112 has been added to incomplete QR code 1100 to form the partially recovered QR code 1110.

Once the function pattern in the incomplete region has been added in step 930, method 900 moves to step 940 to randomly add pixels in the remaining area of the incomplete region to obtain a normal QR code. Thus, with respect to step 940, as shown in FIG. 11C, black and white pixels 1122 can be randomly added to the remaining region so as to obtain the restored QR code 1120.

Following this, method 900 moves to step 950 to identify the normal QR code. If the obtained normal QR code cannot be successfully identified, method 900 moves step 960 where, the pixels outside the function pattern within the incomplete region are cleared and method 900 returns to step 940. The process repeated unit the obtained QR code can be identified.

However, if the number of unsuccessful attempts to identify the QR code reaches a preset number, it indicates that the deformation is too large to be repaired successfully, and a reminder message can be sent out to remind the user to take a picture of the incomplete QR code again perpendicular to the plane of the QR code. On the other hand, if the normal QR code is successfully identified, method 900 moves to step 970 where the normal QR code is output.

One of the benefits of the present invention is that it is highly unlikely that a malicious third terminal can determine the original QR code because it is highly likely that the malicious third terminal will only be able to capture an image of the incomplete QR code at an angle that leads to excessive deformation. The prior art approaches to correcting deformation rely on the presence of the alignment patterns and the position detection patterns. With one or more of the alignment patterns and the position detection patterns removed, the prior art approaches cannot correct the deformation.

Thus, through the above embodiments, it can be known that the embodiments of the present invention have the following beneficial effects. The present application generates an incomplete QR code, which is missing at least one alignment pattern and/or at least one position detection pattern. The current QR code identification technology cannot identify the incomplete QR code. Thus, even if a third terminal held by a malicious user obtains the incomplete QR code, it is very unlikely that the incomplete QR code can be identified, thereby protecting the data security of the QR code.

In order to facilitate a second terminal held by a user to identify the QR code, a technology for identifying the incomplete QR code is further provided, thereby preventing data leakage and ensuring data security and at the same time, ensuring the QR code can still be used.

The present application further provides a QR code generating and identifying system, and the system includes a first terminal and a second terminal. The first terminal generates an original QR code based on data, and performs an invisible (blanking) operation on a partial region of the original QR code so as to obtain an incomplete region. The partial region of the original QR code includes at least one alignment pattern and/or at least one position detection pattern. Obtaining and displaying an incomplete QR code includes the incomplete region. The second terminal obtains an image comprising the incomplete QR code, repairs the incomplete region of the incomplete QR code, and obtains and identifies a normal QR code. The execution process of the first terminal can be seen in detail in the method shown in FIG. 8. For the execution process of the second terminal, the embodiment shown in FIG. 9 can be seen in detail.

The application also provides a QR code identification system that includes a first terminal and a second terminal. The first terminal displays an incomplete QR code including an incomplete region. The incomplete QR code is missing at least one alignment pattern, or at least one position detection pattern. The second terminal scans the incomplete QR code to obtain an image including the incomplete QR code, repair the incomplete region of the incomplete QR code so as to obtain a normal QR code, identify the normal QR code to obtain payment information, and perform a verification operation based on the private information. In this embodiment, the first terminal may display the generated incomplete image to the second terminal for identification; the execution process of the second terminal is as shown in the embodiment shown in FIG. 9, and the details will not be described herein again.

Figure 12:
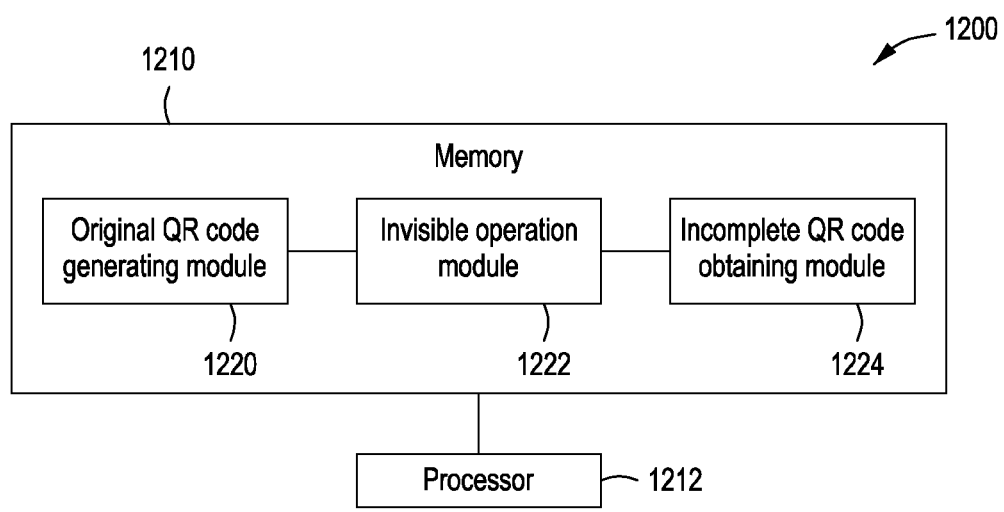
FIG. 12 is a block diagram illustrating an example of a device 1200 for generating an incomplete QR code in accordance with the present invention.

FIG. 12 shows a block diagram that illustrates an example of a device 1200 for generating an incomplete QR code in accordance with the present invention. As shown in FIG. 12, device 1200 includes a memory 1210 and a processor 1212 coupled to memory 1210. Memory 1210 includes an original QR code generating module 1220 that generates an original QR code based on input data, and an invisible operation module 1222 that performs an invisible operation on a partial region of the original QR code so as to obtain an incomplete region. The partial region of the original QR code includes at least one alignment pattern or at least one position detection pattern. Memory 1210 also includes an incomplete QR code obtaining module 1224 that obtains an incomplete QR code comprising the incomplete region. In addition, the incomplete region has an area that is smaller than a product of the area of the original QR code and an error correction level. Processor 1212, in turn, executes the modules in memory 1210.

There are two ways to implement invisible operation module 1222. The first implementation method is a blocking method that includes determining a partial region of the original QR code and a blocking image, adjusting a positional relationship between the original QR code and the blocking image, or adjusting the size of the blocking image such that an overlapping region of the original QR code and the blocking image is the partial region so as to obtain an incomplete QR code. The blocking region is a blank image.

The second implementation method is a deletion method that includes determining a partial region of the original QR code, and deleting the partial region of the original QR code to obtain an incomplete QR code including the incomplete region. The step of determining the partial region of the original QR code in the two implementation methods includes determining a preset attribute of the partial region. The preset attribute includes a shape parameter and a position parameter. In the original QR code, determining the partial region based on the preset attribute.

Taking an incomplete region as an example, the preset attributes include a shape parameter for the partial region (e.g., the side length corresponding to the square), and a position parameter of the partial region (e.g., the lower right corner of the QR code). The product of the side length and the side length is smaller than the product of the area of the original QR code and the error correction level. The device for generating the incomplete QR code can be seen in detail in the embodiment shown in FIG. 8.

Figure 13:
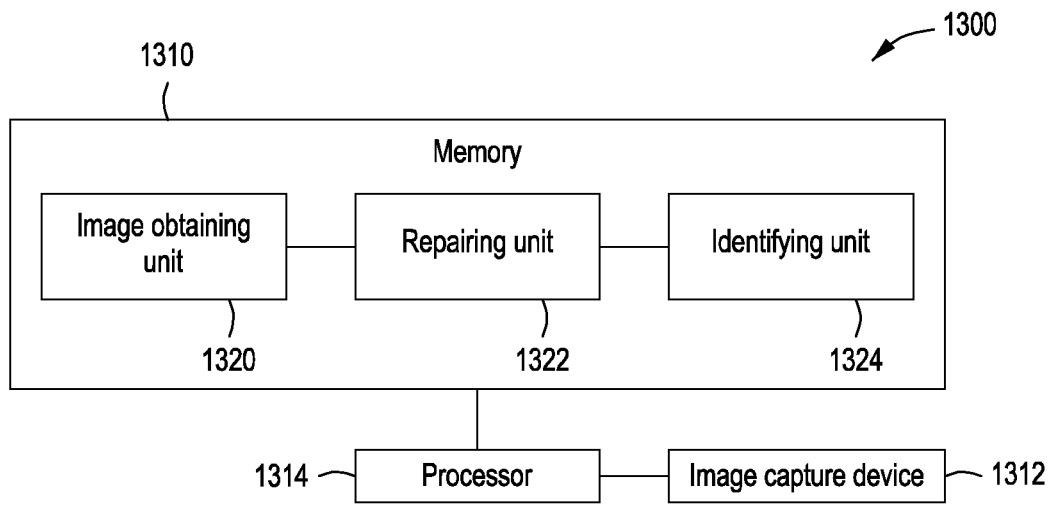
FIG. 13 is a block diagram illustrating an example of a device 1300 for identifying an incomplete QR code in accordance with the present invention.

FIG. 13 shows a block diagram that illustrates an example of a device 1300 for identifying an incomplete QR code in accordance with the present invention. As shown in FIG. 13, device 1300 includes a memory 1310, an image capture device 1312, and a processor 1314 coupled to memory 1310 and device 1312. Memory 1310 includes an image obtaining unit 1320, such as a camera, for obtaining an image of an incomplete QR code. At least one alignment pattern of the incomplete QR code is invisible, or at least one position detection pattern is invisible.

Memory 1310 also includes a repairing unit 1322 for repairing an incomplete region of the incomplete QR code so as to obtain a normal QR code. Further, memory 1310 includes an identifying unit 1314 for identifying the normal QR code. In addition, the trapezoidal deformation of the incomplete QR code in the image including the incomplete QR code is smaller than a preset trapezoidal deformation. Processor 1314, in turn, receives an incomplete QR image from image obtaining unit 1312, and executes the modules in memory 1310.

The image of the incomplete QR code is obtained when the incomplete QR code is shot under the condition that the shooting angle is smaller than the preset angle so that the trapezoidal deformation of the incomplete QR code is smaller than the preset trapezoidal deformation. The shooting angle is formed by a line perpendicular to a plane of the incomplete QR code and passing through a center point of the incomplete QR code, and a line perpendicular to a plane of a lens and passing through a center point of the lens and a center point of the QR code.

In addition, the step of repairing the incomplete region in the incomplete QR code to obtain a normal QR code includes determining a symbol structure corresponding to the incomplete QR code, adding a function pattern of the incomplete QR code in the incomplete region of the incomplete QR code, and randomly adding pixels to a remaining region of the incomplete region so as to obtain the normal QR code.

The step of determining a symbol structure corresponding to the incomplete QR code includes determining a number of modules of a complete side of the incomplete QR code, determining a version identifier of the QR code corresponding to the number of modules, and determining the symbol structure corresponding to the version identifier.

The step of adding a function pattern of the incomplete QR code in the incomplete region of the incomplete QR code includes determining a size of the incomplete QR code, determining the function pattern in the symbol structure corresponding to the incomplete region, and adding in proportion the missed function pattern in the incomplete region of the incomplete QR code according to the size of the incomplete QR code.

The method further comprises a step after identifying the normal QR code. If the normal QR code is not successfully identified, the pixels outside the function pattern in the incomplete region are cleared, and pixels are randomly added to the remaining region of the incomplete region so as to obtain a normal QR code. With regard to the device for identifying the incomplete QR code, the details can be seen in FIG. 9.

Figure 14:
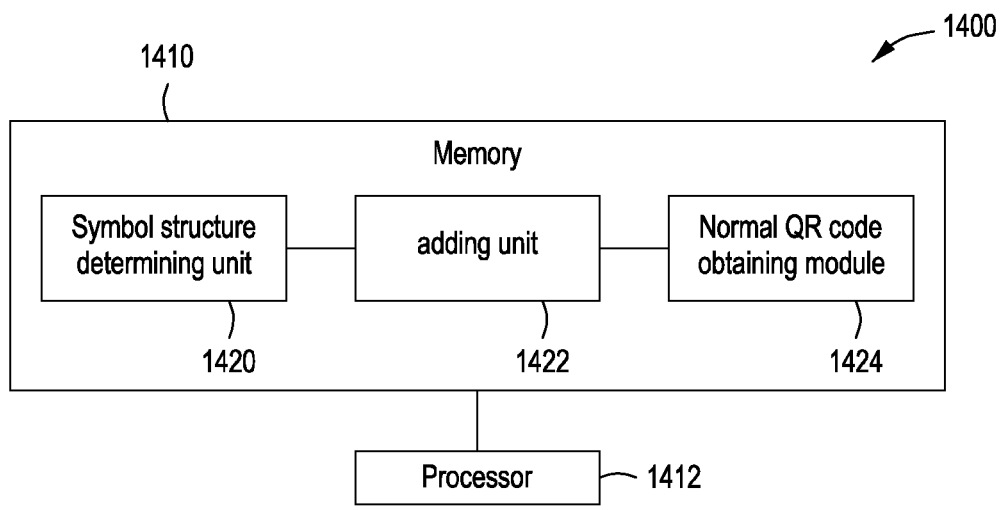
FIG. 14 is a block diagram illustrating an example of a device 1400 for repairing an incomplete QR code in accordance with the present invention.

FIG. 14 shows a block diagram that illustrates an example of a device 1400 for repairing an incomplete QR code in accordance with the present invention. As shown in FIG. 14, device 1400 includes a memory 1410 and a processor 1412 coupled to memory 1410. Memory 1410 includes a symbol structure determining unit 1420 for determining a symbol structure corresponding to an incomplete QR code. At least one alignment pattern of the incomplete QR code is invisible, or at least one position detection pattern thereof is invisible.

Memory 1410 also includes an adding unit 1422 for adding the function pattern missed in the incomplete QR code into an incomplete region of the incomplete QR code, and a normal QR code obtaining unit 1424 for randomly adding pixels to the remaining region of the incomplete region so as to obtain a normal QR code.

Prior to the step of determining a symbol structure corresponding to an incomplete QR code, the method further includes obtaining an image comprising an incomplete QR code. A trapezoidal deformation of the incomplete QR code is smaller than a preset trapezoidal deformation.

After obtaining a normal QR code, the method further includes identifying the normal QR code. If the normal QR code is not successfully identified, the pixels outside the function pattern in the incomplete region are cleared, and then pixels are randomly added to the remaining region of the incomplete region so as to obtain a normal QR code. If the normal QR code is not successfully identified, the normal QR code is output. With regard to the device for repairing the incomplete QR code, the details can be seen in FIG. 9.

Figure 15A:
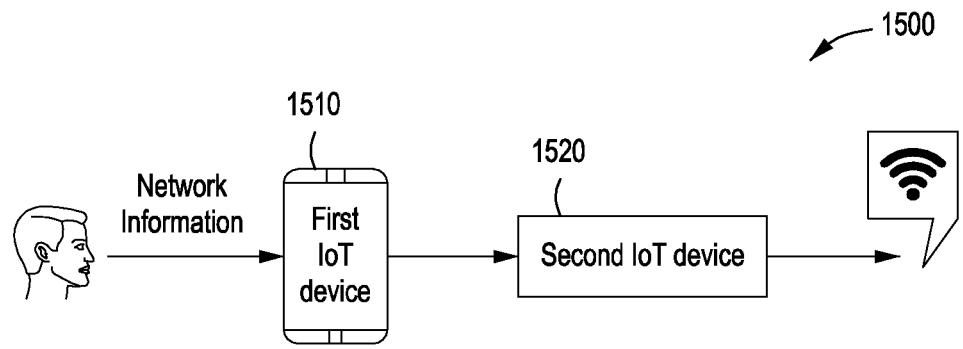
FIG. 15A-15C is a block diagram illustrating an example of a device 1500 for an information interaction system.
Figure 15B:
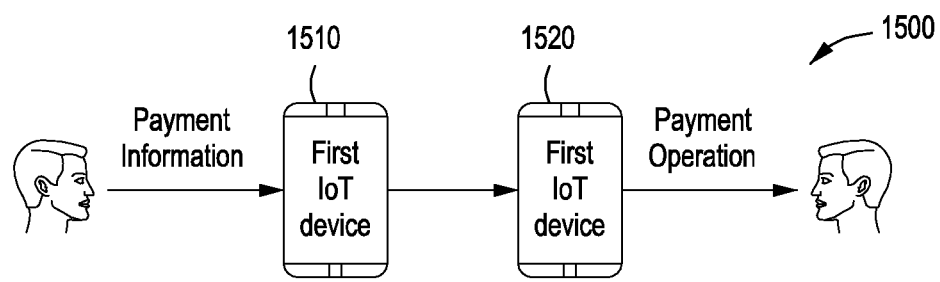
Figure 15C:
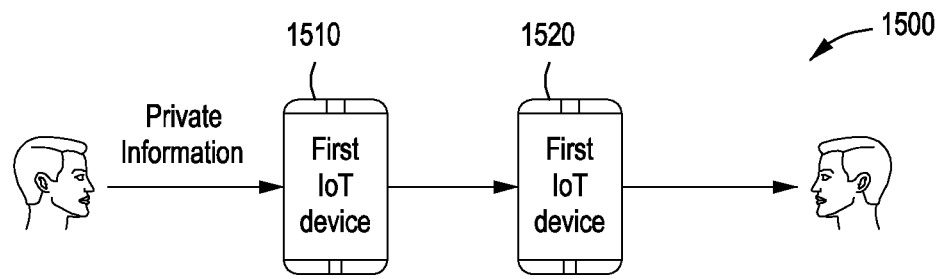

FIGS. 15A-15C show diagrams that illustrate examples of an information interaction system 1500 in accordance with the present invention. As shown in FIGS. 15A-15C, system 1500 includes a first Internet of Things (IoT) device 1510 for generating an original QR code, performing an invisible operation on a partial region of the original QR code so as to obtain an incomplete region, and displaying an incomplete QR code comprising the incomplete region. The partial region of the original QR code includes at least one alignment pattern and/or at least one position detection pattern.

As further shown in FIGS. 15A-15C, information interaction system 1500 also includes a second IoT device 1520 that scans the incomplete QR code so as to obtain an image that includes the incomplete QR code, repairs the incomplete region of the incomplete QR code so as to obtain a normal QR code, and then identifies the normal QR code. The IoT devices include appliances (refrigerators, microwaves), washer/dryer combinations, vacuums, and similar devices.

In a first example, as shown in FIG. 15A, a user can provide network information (such as the network's SSID, password PASS, and encryption methods) to first IoT device 1510 (for example, an application on a mobile phone that controls a second IoT device such as an air conditioner), and request first IoT device 1510 to obtain a device connection to a network.

After obtaining the information, first IoT device 1510 (the air conditioner application) splices into a string of the following format: SSID\r\nPASS\r\n encryption mode and generates a QR code locally according to the foregoing string, removes ⅙ length area in the lower right corner of the QR code, and displays the resulting QR code on the display screen.

Second IoT device 1520 scans the incomplete QR code so as to obtain an image comprising the incomplete QR code, repairs the incomplete region of the incomplete QR code so as to obtain a normal QR code, identifies the normal QR code to obtain the network information, and connects to the Internet of Things based on the network information.

In a second example, as shown in FIG. 15B, a user can provide payment information to first IoT device 1510, which generates an original QR code based on payment information, performs an invisible operation on a partial region of the original QR code so as to obtain an incomplete region, and displays an incomplete QR code comprising the incomplete region. The partial region of the original QR code including at least one alignment pattern and/or at least one position detection pattern.

Second IoT device 1510 scans the incomplete QR code so as to obtain an image comprising the incomplete QR code, repairs the incomplete region of the incomplete QR code so as to obtain a normal QR code, identifies the normal QR code to obtain the payment information, and performs a payment operation based on the payment information.

In a third example, as shown in FIG. 15C, a user can provide private information to first IoT device 1510, which generates an original QR code based on private information, performs an invisible operation on a partial region of the original QR code so as to obtain an incomplete region, and displays an incomplete QR code comprising the incomplete region. The partial region of the original QR code including at least one alignment pattern or at least one position detection pattern.

Second IoT device 1520 scans the incomplete QR code so as to obtain an image comprising the incomplete QR code, repairs the incomplete region of the incomplete QR code so as to obtain a normal QR code, identifies the normal QR code to obtain the private information, and performs a verification operation based on the private information.

The private information includes key information, user business card, user privacy data, and the like, all of which may be transmitted using an incomplete QR code. For different private information, the second terminal may operate differently based on the private information.

For example, when the private information is key information, the second terminal may perform encryption and decryption operations on the key information. When the private information is a user business card, the second terminal may perform operations such as collecting, making a call, etc. based on the user's business card. When the private information is the user privacy data, the second terminal can perform encryption preservation based on the user privacy data and the like.

The present application is applicable to different application scenarios, and the first terminal and the second terminal can perform numerous different operations, which will not be further described herein. The present application further provides a data processing method that includes obtaining an image that includes a first QR code, wherein at least one alignment pattern or one position detection pattern is missing in the first QR code. In addition, the data processing method includes repairing the first QR code so as to obtain a second QR code, and identifying the second QR code.

Further, the step of repairing the first QR code includes determining a symbol structure corresponding to the first QR code, adding a function pattern missed in the first QR code in the incomplete region of the first QR code, and randomly adding pixels to a remaining region of the incomplete region so as to obtain the second QR code.

Moreover, after identifying the second QR code, the method further includes, if the second QR code is not successfully identified, the pixels in the remaining region within the incomplete region are cleared, and pixels are randomly added to the remaining region of the incomplete region so as to obtain the second QR code. With regard to the specific implementation of the data processing method, reference may be made to the embodiment shown in FIG. 9 (the first QR code is equivalent to the incomplete QR code, and the second QR code is equivalent to the normal QR code), and the details will not be described herein again.

The functions described in the method of the present embodiment, if implemented in the form of a software functional unit and sold or used as a standalone product, can be stored in a computing device readable storage medium. Based on such understanding, a portion of the embodiments of the present application that contributes to the prior art or a portion of the technical solution may be embodied in the form of a software product stored in a storage medium, including a plurality of instructions for causing a computing device (which may be a personal computer, a server, a mobile computing device, or a network device, and so on) to perform all or part of the steps of the methods described in various embodiments of the present application. The foregoing storage medium includes: a USB drive, a portable hard disk, a read-only memory (ROM), a random access memory (RAM), a magnetic disk, an optical disk, and the like, which can store program code.

The various embodiments in the specification of the present application are described in a progressive manner, and each embodiment focuses on its difference from other embodiments, and the same or similar parts between the various embodiments may be referred to another case.

The above description of the disclosed embodiments enables a person skilled in the art to make or use the present application. Various modifications to these embodiments are obvious to a person skilled in the art, and the general principles defined herein may be implemented in other embodiments without departing from the spirit or scope of the present application. Therefore, the present application is not limited to the embodiments shown herein, but the broadest scope consistent with the principles and novel features disclosed herein.

What is claimed is:

1. A method of reading a QR code, the method comprising:
capturing an image of an incomplete QR code, the incomplete QR code having a missing region with a functional pattern that is missing;

adding the functional pattern to the missing region in the incomplete QR code to form a recovered QR code;

in response to adding the functional pattern, randomly adding pixels to the missing region surrounding the functional pattern to add to the recovered QR code, wherein the recovered QR code comprises a number of functional patterns and a number of modules; and reading data from the recovered QR code.

2. The method of claim 1, further comprising:

determining a version of a complete QR code that corresponds with the incomplete QR code; and identifying the functional pattern in the complete QR code that is missing in the incomplete QR code, wherein the functional pattern comprises a position detection pattern.

3. The method of claim 2, wherein the functional pattern further comprises an alignment pattern.

4. The method of claim 2, wherein the missing region has an area that is smaller than a product of the area of the complete QR code and an error correction level.

5. The method of claim 2, further comprising:

obtaining the incomplete QR code having the missing region from the captured image, wherein obtaining the incomplete QR code having the missing region comprises:

determining a partial region of an original QR code;

performing a blocking or deletion operation on the partial region of the original QR code by blocking or deleting the partial region to obtain the incomplete QR code.

6. The method of claim 2, wherein the incomplete QR code has a number of modules on a complete side of the incomplete QR code, and wherein the version of the complete QR code that corresponds with the incomplete QR code is determined from the number of modules.

7. The method of claim 6, further comprising:

determining a symbol structure corresponding to the version of the complete QR code, wherein adding the functional pattern to the missing region in the incomplete QR code is based on the determined symbol structure.

8. A non-transitory computer-readable storage medium having embedded therein program instructions, which when executed by a processor causes the processor to execute a method of reading a QR code, the method comprising:

capturing an image of an incomplete QR code, the incomplete QR code having a missing region with a functional pattern that is missing;

adding the functional pattern to the missing region in the incomplete QR code to form a recovered QR code;

in response to adding the functional pattern, randomly adding pixels to the missing region surrounding the functional pattern to add to the recovered QR code, wherein the recovered QR code comprises a number of functional patterns and a number of modules; and reading data from the recovered QR code.

9. The non-transitory computer-readable storage medium of claim 8, wherein the method further comprises:

determining a version of a complete QR code that corresponds with the incomplete QR code; and identifying the functional pattern in the complete QR code that is missing in the incomplete QR code, wherein the functional pattern comprises a position detection pattern.

10. The non-transitory computer-readable storage medium of claim 9, wherein the functional pattern further comprises an alignment pattern.

11. The non-transitory computer-readable storage medium of claim 9, wherein the missing region has an area that is smaller than a product of the area of the complete QR code and an error correction level.

12. The non-transitory computer-readable storage medium of claim 9, wherein the method further comprises:

obtaining the incomplete QR code having the missing region from the captured image, wherein obtaining the incomplete QR code having the missing region comprises:

determining a partial region of an original QR code;

performing a blocking or deletion operation on the partial region of the original QR code by blocking or deleting the partial region to obtain the incomplete QR code.

13. The non-transitory computer-readable storage medium of claim 9, wherein the incomplete QR code has a number of modules on a complete side of the incomplete QR code, and wherein the version of the complete QR code that corresponds with the incomplete QR code is determined from the number of modules.

14. The non-transitory computer-readable storage medium of claim 13, wherein the method further comprises:

determining a symbol structure corresponding to the version of the complete QR code, wherein adding the functional pattern to the missing region in the incomplete QR code is based on the determined symbol structure.

15. A QR code device, comprising:

a memory;

an image capture device; and a processor coupled to the memory and the image capture device, wherein the processor is configured to:

capture an image of an incomplete QR code, the incomplete QR code having a missing region with a functional pattern that is missing;

add the functional pattern to the missing region in the incomplete QR code to form a recovered QR code;

in response to addition of the functional pattern, randomly add pixels to the missing region surrounding the functional pattern to add to the recovered QR code, wherein the recovered QR code comprises a number of functional patterns and a number of modules; and read data from the recovered QR code.

16. The QR code device of claim 15, wherein the processor is further configured to:

determine a version of a complete QR code that corresponds with the incomplete QR code; and identify the functional pattern in the complete QR code that is missing in the incomplete QR code, wherein the functional pattern comprises a position detection pattern.

17. The QR code device of claim 16, wherein the functional pattern further comprises an alignment pattern.

18. The QR code device of claim 16, wherein the processor is further configured to:

obtain the incomplete QR code having the missing region from the captured image, wherein to obtain the incomplete QR code having the missing region, the processor is configured to:

determine a partial region of an original QR code;

perform a blocking or deletion operation on the partial region of the original QR code by blocking or deleting the partial region to obtain the incomplete QR code.

19. The QR code device of claim 16, wherein the incomplete QR code has a number of modules on a complete side of the incomplete QR code, and wherein the version of the complete QR code that corresponds with the incomplete QR code is determined from the number of modules.

20. The QR code device of claim 19, wherein the processor is further configured to:
   determine a symbol structure corresponding to the version of the complete QR code, wherein the functional pattern is added to the missing region in the incomplete QR code based on the determined symbol structure.

* * * * *